United States Patent Office 3,493,078
Patented Feb. 3, 1970

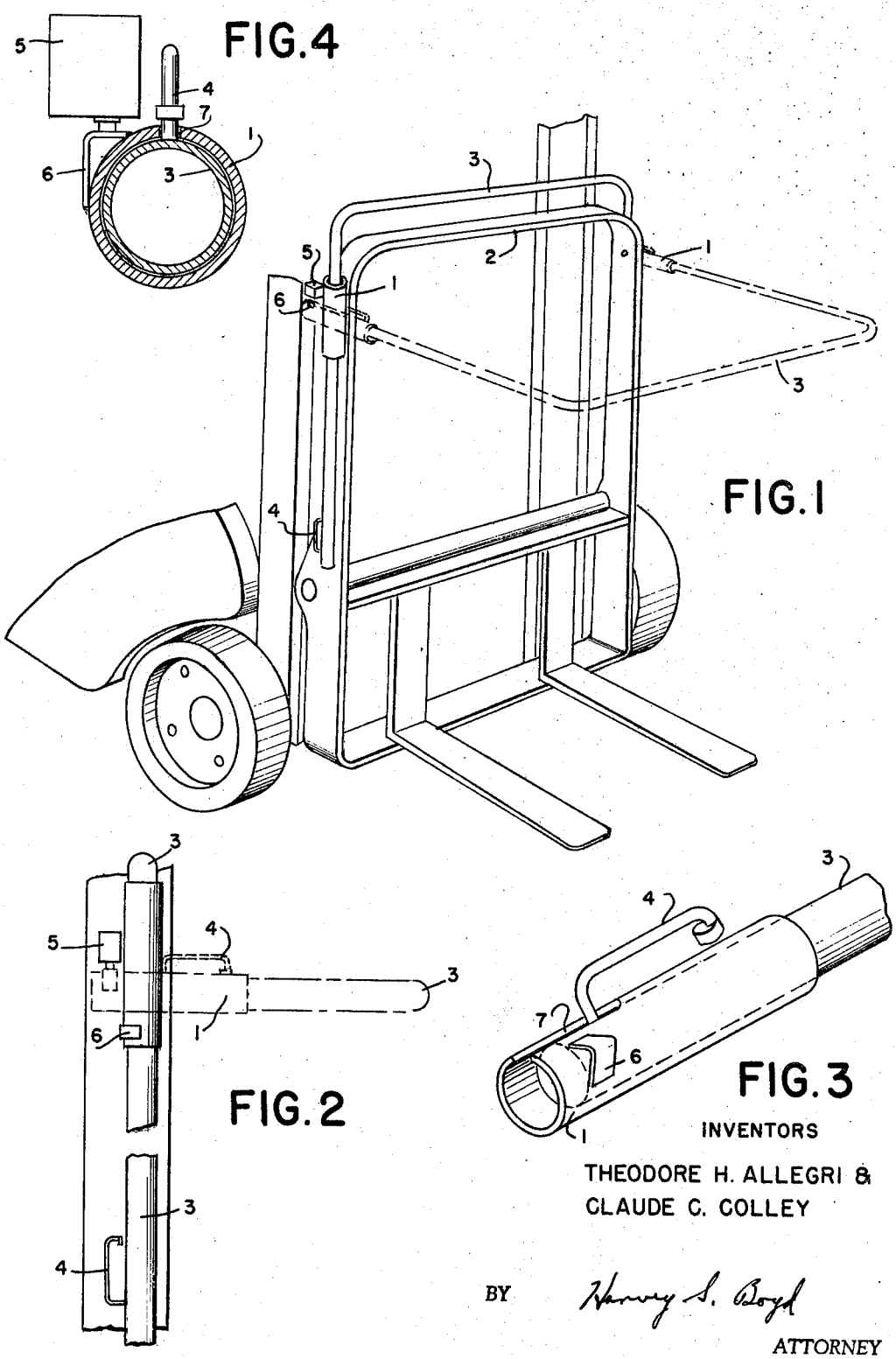

3,493,078
ELECTRICALLY INTERLOCKED PIPE GUARD-RAIL AND SAFETY PLATFORM FOR LIFT TRUCK OPERATION
Theodore H. Allegri, 9592 Pekin Road, Novelty, Ohio 44072, and Claude C. Colley, 3832 Porter St. NW., Washington, D.C. 20016
Filed Jan. 19, 1968, Ser. No. 699,247
Int. Cl. A47l 3/02; E04g 5/00
U.S. Cl. 182—113       8 Claims

ABSTRACT OF THE DISCLOSURE

This invention relates to a safety device for a forklift truck. The device is a safety guardrail which may be mounted on a standard forklift truck. It consists of a U-shaped pipe, each end of which is slidably received in a pivotal connection on the back plate of the forklift truck, and adapted to operate an electrical switch in a remote control circuit. The device functions so that the forks of the truck cannot be operated by remote control unless the guardrail is in a predetermined position to coact with the switch.

BACKGROUND OF THE INVENTION

This invention relates to a safety device for a forklift. In warehouse use, forklift trucks are normally equipped for remote control operation so that an operator may place a warehouse pallet on the forks, dismount from the driver's seat, may climb aboard the pallet, and using the remote control levers, raise and lower the pallet. In some special installations a forklift truck operator may also drive the forklift truck steering it by using the remote control apparatus.

Operation of the forklift as described can result in serious accidents if, for example, the operator should slip off.

There is a safety platform commercially available. This prior art device is a large steel weldment which is picked up by the forks of the truck which usually includes a chain across at least one side of the safety platform to permit the operator to enter the platform or to bring objects such as cartons and cases onto the platform when he is operating the truck by remote control. This safety platform is a separate unit which must be picked up for use and stored in some convenient location when not in use, and cannot be carried with the forklift truck at all times. A large number of pallet receiving and discharging functions that the normal forklift truck is supposed to perform cannot be performed when the safety platform is in use. Searching for the prior art type safety platform and placing it on the forks are time consuming. In an effort to cut time and meet work quotas, operators tend to take the risk and operate the forklift by remote control without the prior art safety platform.

SUMMARY OF THE INVENTION

This invention provides a novel solution to the problems described above by providing a guardrail in combination with a forklift truck which is movable from a stored position on the backrest of the forklift to a position providing an enclosure for the forklift area. Upon movement to a final position the guardrail coacts with a control means permitting remote control of the forklift. It is an object of this invention to provide a safety guardrail that is self-storing on the load backrest without interfering with the normal operation of the forklift. It is a further object to provide a safety device which makes the remote control device inoperative unless the guardrail is in the proper position.

BRIEF DESCRIPTION OF THE DRAWING

FIG. 1 is a perspective view of the safety device mounted on a forklift truck having the guardrail in a vertical position with a phantom view of the guardrail horizontal for use;

FIG. 2 is a side view of the safety device in a horizontal position;

FIG. 3 is a perspective view showing the interconnection of the guardrail and the trunnion sleeve; and FIG. 4 is a view including a partial vertical section of the trunnion in horizontal position and showing the relationship of the striker plate and electrical switch.

DESCRIPTION OF THE PREFERRED EMBODIMENT

The automatic, electrically interlocked, pipe guardrail and safety platform comprises a pipe sleeve trunnion 1 pivotally connected to each side of the load backrest 2. Through this pivoted trunnion 1 a U-shaped pipe guardrail 3 is placed. Handle 4 serves as a restraining boss for the pipe guardrail 3 and is mounted on the guardrail 3 near the end of each leg. A microswitch 5, which is normally open, is mounted on one side of the load backrest 2 and is electrically connected in the conventional remote control circuit between the electrical power source and the operator's remote control panel. A striker plate 6 is mounted on the trunnion 1 so that when the trunnion 1 is pivoted, plate 6 will strike switch 5 closing the circuit and allowing the forklift to be operated by remote control. The trunnion 1 is provided with a cutaway slot 7, which receives the handrail 4.

Having thus described the preferred physical embodiment of the invention the operation will now be described. With the safety guardrail in the stored position, the U-shaped guardrail 3 will be in a vertical position surrounding the load backrest 2. The switch 5 is open and the operator is unable to operate the forklift by remote control.

In order to activate the remote control device, the operator will lower the forks and pick up a hardwood warehouse pallet in the usual manner. Then the operator will dismount from the vehicle and stand on the pallet. Grasping either handle 4, the operator elevates the guardrail 3 through the pipe sleeve trunnion 1, the handle 4 entering the slot 1. Then the trunnion 1 is rotated to an angular position with respect to the back rest, as for example, when guardrail 3 is horizontal, surrounding the operator and the striker plate 6 strikes switch 5 closing the remote control circuit. Switch 5 acts as a stop, and coacts with trunnion 1 to support guardrail 3 in the angular position.

We claim:
1. In a safety device for a forklift truck having a horizontal floor and a vertical back rest the improvement comprising:
  (a) a guardrail pivotally connected at an end thereof to the back rest of said forklift, said connection restricting movement of said guardrail to include a raised, vertical position and a lowered horizontal position;
  (b) at least one sleeve rotatably connected to said back rest and slidably receiving an end of said guardrail; and
  (c) a stop mounted on the back rest adjacent said sleeve so that when the end of said guardrail is slidably received in said sleeve and said guardrail is moved to the lowered position said stop coacts with said sleeve to hold said guardrail in the lowered position.
2. In a remote control electrical circuit for operating a forklift the improvement comprising a normally open switch, said switch closing responsive to the movement of a rail member, pivotally attached at an end thereof to said forklift, from a raised, vertical position to a lowered angular position so that said forklift is inoperable by remote control unless said rail is in the lowered position to provide a safety guardrail for the forklift.

3. A safety device for a forklift truck having a horizontal floor and a vertical back rest comprising:
 (a) at least one sleeve rotatably attached to said back rest, the rotational movement of said sleeve including a vertical position and angular positions relative to the vertical position;
 (b) a rail slidably mounted at an end thereof in said sleeve, the end of said rail extending through said sleeve, so that when said sleeve is in an angular position said rail extends from said back rest over said floor to form a guardrail for said forklift floor;
 (c) a stop mounted on said back rest adjacent said sleeve, said stop controlling the rotation of said sleeve so that when said guardrail is in an angular position said stop coacts with said sleeve to hold said guardrail in the angular position; and
 (d) electrical switch means attached to said back rest for controlling a preselected function of said forklift truck, said switch means being normally open and closing responsive to the movement of said sleeve and said rail to an angular position.

4. The device of claim 3 wherein the switch means comprises:
 (a) a normally open microswitch carried by said stop;
 (b) a striker plate carried by said sleeve, said plate registering on said switch so that when said sleeve rotates to an angular position said plate engages said switch, closing said switch.

5. The device of claim 4 wherein the preselected function of the forklift truck comprises a remote control electrical circuit for operating the truck and raising and lowering the floor from a remote position and the switch means is connected in the circuit for allowing said remote control operation only when said rail is in an angular position and said switch is closed.

6. A safety device for a forklift truck having a horizontal floor for carrying a load and a vertical back rest comprising:
 (a) a U-shaped guardrail having a base, a first leg, and a second leg, each leg having a handle distally mounted thereon;
 (b) a first sleeve rotatably mounted on the back rest and surrounding the first leg of said guardrail;
 (c) a second sleeve rotatably mounted on the back rest parallel to said first sleeve and surrounding the second leg of said guardrail, said first and second sleeves slidably receiving said legs for movement of said guardrail from a first position where said sleeves are vertical and said sleeves support said guardrail to a second position wherein said sleeves are substantially horizontal and disposed on the legs of said guardrail distally to said base so that said legs and base extend from the back rest and surround the load area above said forklift floor;
 (d) a first stop mounted on the back rest adjacent said first sleeve;
 (e) a second stop mounted on the back rest adjacent said second sleeve, said first and second stops restricting the rotation of said first and second sleeves and coacting with said sleeves when said guardrail is in the second position to support said guardrail in the said second position.

7. The device of claim 6 further comprising:
 (a) a normally open electrical switch mounted on at least one of said stops, said switch connected in an electrical circuit means for operating the said forklift by remote control;
 (b) means mounted on at least one of said sleeves for closing said switch when said sleeves and stops support said guardrail in the second position so that the said forklift cannot be operated by remote control unless said guardrail is in the second position.

8. The device of claim 6 wherein the sleeves have handle receiving slots and the handles distally mounted on the legs of said guardrail enter the slots of the said sleeves when the said guardrail is in the second position to stop further movement of the legs through the said sleeves.

References Cited

UNITED STATES PATENTS

| | | | |
|---|---|---|---|
| 1,616,395 | 2/1927 | Schwan | 182—113 |
| 3,016,973 | 1/1962 | Williamson | 182—148 |

FOREIGN PATENTS 918,784   2/1963   Great Britain.

REINALDO P. MACHADO, Primary Examiner